United States Patent [19]

Hajjar et al.

[11] Patent Number: 5,696,752
[45] Date of Patent: Dec. 9, 1997

[54] LOW NOISE ATIP DETECTION FROM AN OPTICAL RECORDING MEDIUM WITH WOBBLED GROOVES

[75] Inventors: Roger A. Hajjar, Faiport; Jeffrey T. Klaus, Rochester, both of N.Y.

[73] Assignee: Eastman Kodak Company, Rochester, N.Y.

[21] Appl. No.: 587,178

[22] Filed: Jan. 16, 1996

[51] Int. Cl.$^6$ ........................................ G11B 7/00
[52] U.S. Cl. ............... 369/124; 369/44.13; 369/107; 369/48; 369/54; 369/59
[58] Field of Search ............... 369/44.13, 44.29, 369/275.4, 48, 50, 54, 59, 124, 107

[56] References Cited

U.S. PATENT DOCUMENTS

| | | | |
|---|---|---|---|
| 5,339,302 | 8/1994 | Takahashi et al. | 369/54 |
| 5,363,360 | 11/1994 | Fairchild | 369/48 |
| 5,506,824 | 4/1996 | Fairchild et al. | 369/48 |
| 5,537,373 | 7/1996 | Horikiri | 369/44.13 |
| 5,539,724 | 7/1996 | Ohtomo | 369/275.4 |

*Primary Examiner*—David C. Nelms
*Assistant Examiner*—Kim-Kwok Chu
*Attorney, Agent, or Firm*—Raymond L. Owens

[57] ABSTRACT

An apparatus for use in an optical system in which information is read from a recorded wobbled groove of an optical medium by detecting first and second portions of a return beam in first and second detectors producing detected signals, respectively, the apparatus comprising:

gain control circuit means coupled to the first and second detectors, respectively, and receiving the first and second detected signals therefrom;

the gain control circuit means being responsive to the detected signals for producing a summation signal which is a function of the sum of the two detected signals;

a first signal difference circuit coupled to the first and second detected signals for providing a difference signal; and a second signal difference circuit responsive to the difference signal and the summation signal for producing a wobbled groove information signal.

7 Claims, 4 Drawing Sheets

LOW NOISE ATIP DETECTION FROM AN OPTICAL RECORDING MEDIUM WITH WOBBLED GROOVES

CROSS REFERENCE TO RELATED APPLICATIONS

Reference is made to commonly-assigned U.S. patent applications Ser. No. 08/397,701 filed Mar. 1, 1995 by Gage et al. and entitled "Optical Data Storage System with Differential Data Detection and Source Noise Subtraction for use with Magneto-Optic, Write-Once and other Optical Media"; Ser. No. 08/397,293 filed Mar. 1, 1995 by Gage et al. and entitled "Magneto-Optic Data Storage System with Differential Detection Channels Having Separate Gain Control Circuits"; and Ser. No. 08/586,518 filed Jan. 16, 1996 by Gage et al and entitled "Wobbled Groove Signal Detection in an Optical System Using Separately-Controlled Variable Gain Channels," the disclosures of which are incorporated herein by reference.

FIELD OF THE INVENTION

The present invention relates generally to optical data storage. More particularly, the present invention relates to an improved optical system which utilizes absolute-time-in-pregroove (ATIP) for a recorded disk by subtracting out the effect of data.

BACKGROUND OF THE INVENTION

In a typical optical data storage system, information is recorded on or read from a storage medium such as an optical disk using a radiation beam supplied by a laser or other suitable optical source. Proper information recording or retrieval in a disk-based system generally requires that the system be able to ascertain the velocity at which the disk is spinning as well as the beam position on the disk surface. A known technique for providing the disk velocity and beam position involves "wobbling" a spiral groove on the disk about an average centerline of the groove. The deviation of the groove from the centerline is referred to as the wobble amplitude. When the wobbled-groove disk is rotated at, for example, a constant linear velocity of 1.4 meters/second, the wobble amplitude variation will modulate a push-pull tracking signal at a fundamental wobble frequency. A servo loop can provide the desired disk velocity by controlling the disk motor speed to maintain the tracking signal modulation at the wobble frequency.

Beam position information may be stored in the form of frequency modulation of the groove wobble. The information frequency-modulated onto the groove wobble is often referred to as absolute-time-in-pregroove (ATIP) information. ATIP information typically includes binary data indicating the amount of time the beam would have spent in the spiral groove to reach a given position on the disk surface by following the groove from its beginning at the inner disk diameter. The amount of time may be represented in minutes, seconds and frames, with a frame corresponding to, for example, 1/75 of a second, and can be used to determine the location of a particular data track on the disk surface. The ATIP modulation may also include other information such as a disk identifier, synchronization marks and the expected optimum recording power. Additional details on ATIP can be found in U.S. Pat. No. 5,363,360, which is assigned to the present assignee and incorporated herein by reference.

The ATIP information is typically detected using differential detection channels which sense the radiation in two half-aperture components of a return beam reflected and diffracted from the medium. Each of the half-aperture components is applied to a separate detector element of a multi-element photodetector. The resulting detected signals are applied to inputs of a differential amplifier which generates an ATIP information signal representative of the information modulated onto the wobbled groove. ATIP performance after recording may be degraded as a result of increased noise levels due to the recorded marks in the groove. The effect of data (RF) on ATIP is exacerbated by an imbalance in the combined optical and electrical gains applied to the two detected signals prior to their subtraction in the differential amplifier. For example, optical gain imbalance may result from an asymmetric light distribution on the detector elements which can be caused by cross-track tilt, lens displacement or optical aberrations. An electronic gain imbalance can be caused by mismatch in amplifier gain, detector sensitivity or detector alignment between the two detection channels.

An exemplary ATIP detection system which adjusts the gain of one of the signal paths to reduce gain imbalance is described in Takahashi et al. U.S. Pat. No. 5,339,302. In the Takahashi system, a differential amplifier is used to generate the ATIP information signal from the outputs of a multi-element photodetector. The output of the differential amplifier is applied to an ATIP decoder and is also fed back to a variable gain amplifier placed in one of the detection channels before the differential amplifier. The variable gain amplifier adjusts the signal gain in the one channel such that the difference between the detected signal amplitudes at the input of the differential amplifier approaches zero, in order to reduce the amount of RF noise on the ATIP information signal.

However, single-channel variable gain detection systems such as that disclosed by Takahashi et al. suffer from a number of problems. For example, a single-channel variable gain system may have difficulty recovering from media defects, out-of-focus conditions and other non-ideal operating conditions. In addition, these systems are often unable to adequately compensate for undesirable output signal modulation resulting from, for example, media birefringence. Another problem with the single-channel approach is that the ATIP signal gain is generally not predetermined. An automatic gain control (AGC) amplifier may therefore be required between the differential amplifier and the ATIP decoder, resulting in a more complex detection system. Further problems include long-term drift in signal levels, and variable phase shifts as a function of signal level.

SUMMARY OF THE INVENTION

It is an object of the present invention to provide the recorded wobbled groove signal detection which provides an improved response in the presence of non-ideal conditions, exhibits reduced spurious modulation, provides more predictable output signal levels, and avoid the long-term drift, variable phase shifts and other problems of the prior art.

Another object of the invention is an apparatus for use in an optical system in which information is read from a recorded wobbled groove of an optical medium by detecting first and second portions of a return beam in first and second detectors producing detected signals, respectively, the apparatus comprising:

gain control circuit means coupled to the first and second detectors, respectively, and receiving the first and second detected signals therefrom;

the gain control circuit means being responsive to the detected signals for producing a summation signal which is a function of the sum of the two detected signals;

a first signal difference circuit coupled to the first and second detected signals for providing a difference signal; and a second signal difference circuit responsive to the difference signal and the summation signal for producing a wobbled groove information signal.

ADVANTAGES

The present invention provides a number of advantages including increased common-mode rejection and output signal-to-noise ratio as well as an improved response to non-ideal conditions such as out-of-focus.

Further features of the invention, its nature and various advantages will become more apparent from the accompanying drawings and following detailed description of the invention.

DETAILED DESCRIPTION OF THE EMBODIMENTS

Figure 1:
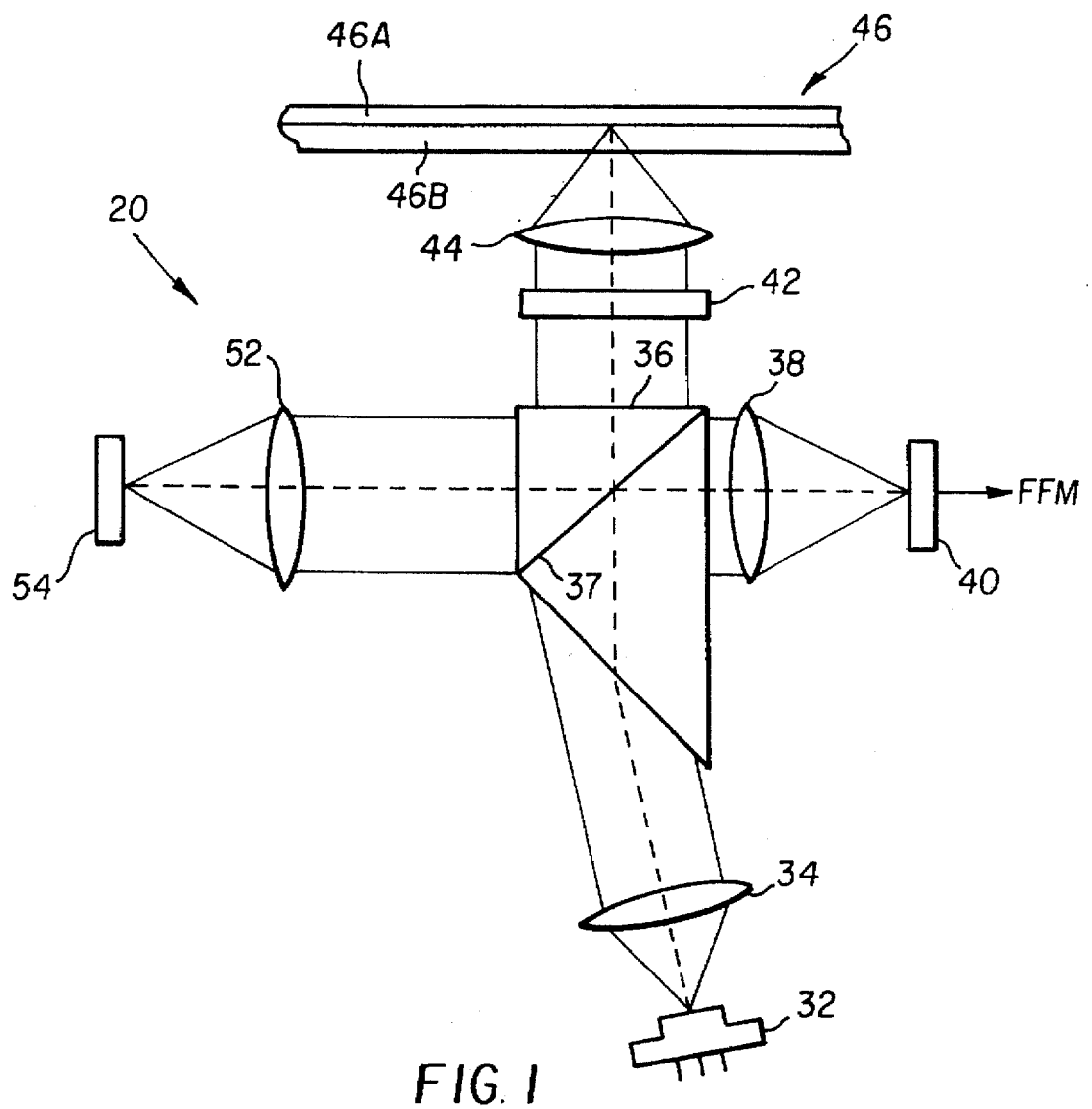
FIG. 1 is an exemplary optical data storage system in which the present invention may be utilized.

FIG. 1 shows an exemplary optical recording system 20 in which the wobbled groove detection of the present invention may be utilized. It should be emphasized that the present invention could also be utilized in a variety of alternative optical systems, including any system in which a detected signal is generated from a wobbled groove or other optically-detectable information-bearing tracking structure on an optical storage medium. The term "wobbled groove" as used herein should therefore be understood to include alternative tracking structures which may be utilized in an optical system to provide an ATIP signal or any other information signal.

An incident radiation beam is generated by an optical source 32, which may be, for example, a laser diode, a laser or an LED. The optical source 32 produces an incident radiation beam at a given wavelength, which will generally vary depending upon the application. An exemplary wavelength suitable for use in the optical recording system 20 is about 780 nanometers. The radiation beam from optical source 32 is collimated by a collimating lens 34, which in this embodiment may have a focal length on the order of 8 mm. The collimated radiation beam is transmitted through a polarization beam expander/splitter 36. Alternative beam expansion techniques could be used, such as including a circularizing lens (not shown) in the path of the incident beam, and would generally alter the desired focal length of collimating lens 34. A suitable circularizing lens is the model VPS700 lens available from Blue Sky Research of San Jose, Calif. Of course, in other embodiments a conventional beam splitter could be used in place of polarization beam expander/splitter 36.

The polarization beam expander/splitter 36 may have an s-polarization reflectivity of about 100% and a p-polarization reflectivity of about 20%, indicating that 100% and 20% of the intensity of the s-polarized beam components and p-polarized beam components, respectively, are reflected by an internal surface 37, and any remaining portions are transmitted through the internal surface 37. A portion of the incident radiation beam is thus reflected by internal surface 37 toward a detector focusing lens 38 and thereby focused onto a front facet detector 40. The reflected portion of the linearly-polarized radiation beam thus includes both s-polarized and p-polarized components, which are detected in front facet detector 40 to provide an indication of the intensity level of the incident radiation beam. The front facet detector 40 is also referred to as a front facet monitor (FFM) or, more generally, an optical source monitor. An FFM signal from front facet detector 40 may be used, for example, to normalize a tracking or data signal, or in a source power servo loop (not shown) to maintain the output power level of optical source 32 at a desired value. The FFM signal could also be used in a front facet subtraction technique to reduce source noise in a write-once (WO) RF data signal. See, for example, U.S. Pat. No. 5,363,363 entitled "Apparatus and Method for Laser Noise Cancellation in an Optical Storage System Using a Front Facet Monitor Signal," which is assigned to the assignee of the present invention and incorporated by reference herein.

The portion of the incident radiation beam which is not reflected by internal surface 37 to front facet detector 40 passes through internal surface 37 and a quarter wave plate 42 and is incident on an objective lens 44. The internal surface 37 of polarization beam expander/splitter 36 transmits a linear p-polarization of the radiation beam, which is perpendicular to the s-polarized portion of the radiation beam reflected by internal surface 37. The direction of the incident beam may be altered by including additional optical elements (not shown), such as a turning prism or fully-reflecting mirror, between the polarization beam expander/splitter 36 and the objective lens 44. For example, a turning prism or reflecting mirror could be arranged to reflect the beams by 90° to facilitate placement of the components of optical recording system 20 relative to the storage medium in a reduced-height optical disk drive.

Objective lens 44 focuses the incident beam onto an optical storage medium 46. The optical storage medium 46 is typically an optical disk which includes data tracks (not shown) arranged in a spiral or in concentric circles on a data storage surface 46A. A portion of the optical storage medium 46 is shown in a side-sectional view in FIG. 1. The optical storage medium 46 may be an absorptive dye, ablative or phase-change write-once (WO) medium, a magneto-optic (MO) medium, or any other medium on which optically-detectable marks may be formed. The storage medium may include a transparent substrate 46B which serves as a protective layer over the data storage surface 46A. The exemplary optical storage medium 46 in this embodiment also includes a groove or other optically-detectable structure suitable for generating a tracking signal using known techniques. It will be assumed for the remainder of the description that optical storage medium 46 is a WO medium, and that the groove thereof is wobbled to include ATIP information as was described in greater detail above.

The incident radiation beam reads data previously recorded in the form of marks on optical storage medium 46 by detecting variations in a return beam reflected from the medium. The optical recording system 20 may also be used to record data on the optical storage medium 46 by modifying the power level of the incident beam or by providing additional recording system elements, the placement and operation of which are generally well-known in the art. The return beam is collimated by objective lens 44, substantially reflected by internal surface 37, and then applied to a detector focusing lens 52. The detector focusing lens 52 focuses the transmitted portion of the beam onto a multi-element detector 54.

Figure 2:
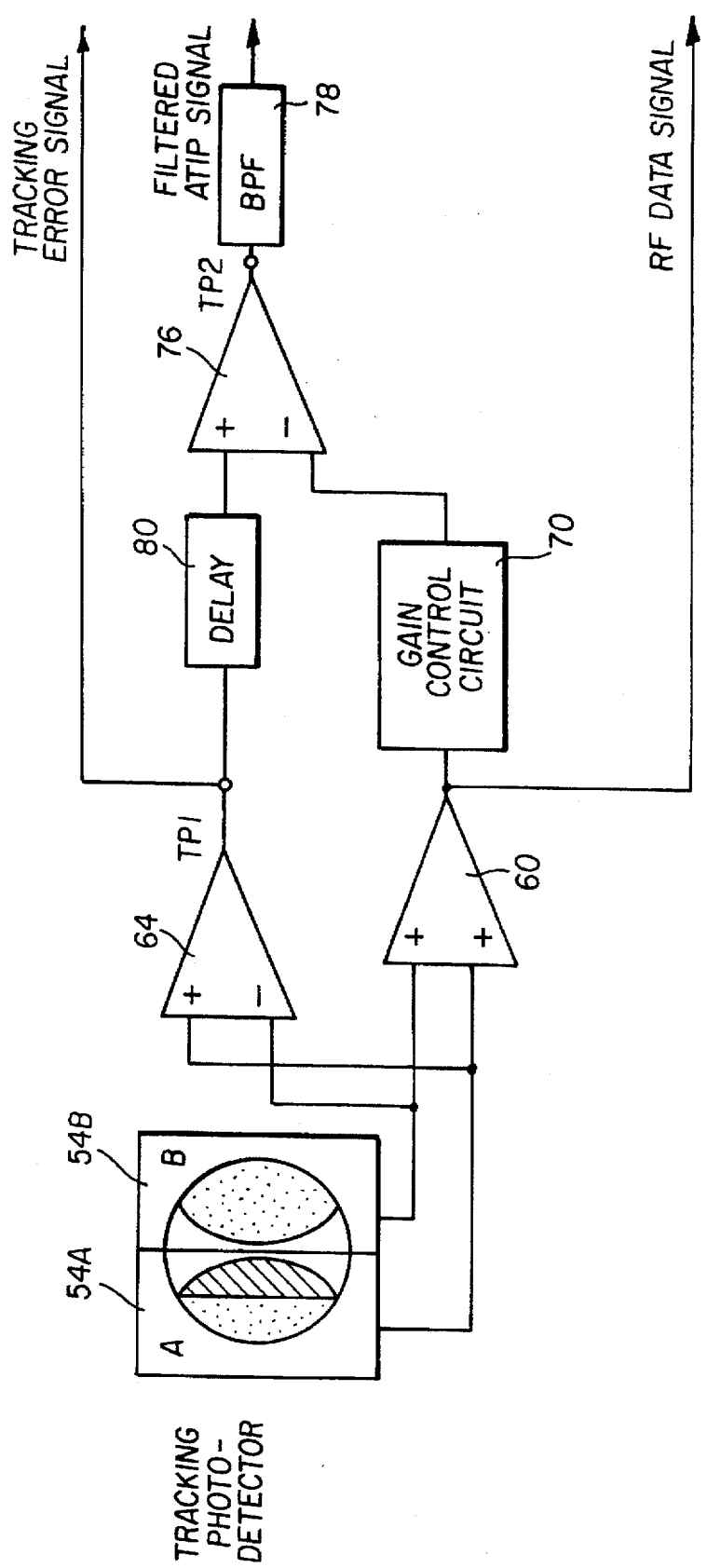
FIG. 2 is a schematic diagram illustrating the generation of an RF data signal, a tracking error signal and an ATIP signal in accordance with the present invention using detected signals from the system of FIG. 1.

FIG. 2 illustrates the generation of an RF data signal, a tracking error signal and an ATIP signal using detected signals from the multi-element detector 54. The multi-element detector 54 in this embodiment includes first and second detector elements 54A and 54B. The detector elements 54A, 54B generate first and second detected signals S1 and S2 from the return beam. Detector elements 54A, 54B may be, for example, positive-intrinsic-negative (PIN) or avalanche photodiodes, or any other device capable of detecting incident optical radiation. The detector elements are arranged such that each element receives a first order diffraction component in a half-aperture of the return beam. An RF data signal (summation signal) is generated by summing the detected signals S1 and S2 in a summing amplifier 60. A push-pull tracking error signal is generated by taking the difference between detected signals S1 and S2 in a difference amplifier 64.

An ATIP signal is generated in FIG. 2 in the following manner. Detected signals S1 and S2 are applied to a gain control circuit 70, which adjusts the summation signal amplitude as will be described below in conjunction with FIG. 3. The resulting output signal and the output of the difference amplifier 76 are applied to a differential amplifier 76 which generates an ATIP signal. The ATIP signal is filtered in a bandpass filter (BPF) 78 which generally passes a range of frequencies including the fundamental wobble frequency as well as any frequency modulation thereof. The filtered ATIP signal is applied to an ATIP decoder (not shown) in order to recover the ATIP information modulated onto the groove wobble. Although illustrated herein using ATIP detection, the present invention is more generally applicable to the detection of other types of information stored in wobbled grooves or other diffracting structures of an optical medium.

The detected signals may be substantially in-phase at the input of differential amplifier 76 such that additional delay adjustment is unnecessary. In other embodiments, a delay element 80 may be used to adjust the detected signal phase in at least one of the detected signal paths such that the detected signals are in-phase at the input of differential amplifier 76. Delay element 80 may be, for example, an electronically programmable delay line providing a selectable amount of delay in discrete increments, or a single fixed amount of delay calculated to provide the desired phase matching. The amount of delay provided by delay element 80 will generally vary depending upon, for example, the relative length of the detected signal paths. Although the delay element 80 is shown in one detected signal channel in FIG. 2, it should be understood that delay may be introduced in the other channel only, in both of the channels, or in neither channel if the two channels are inherently phase-matched.

Figure 3:
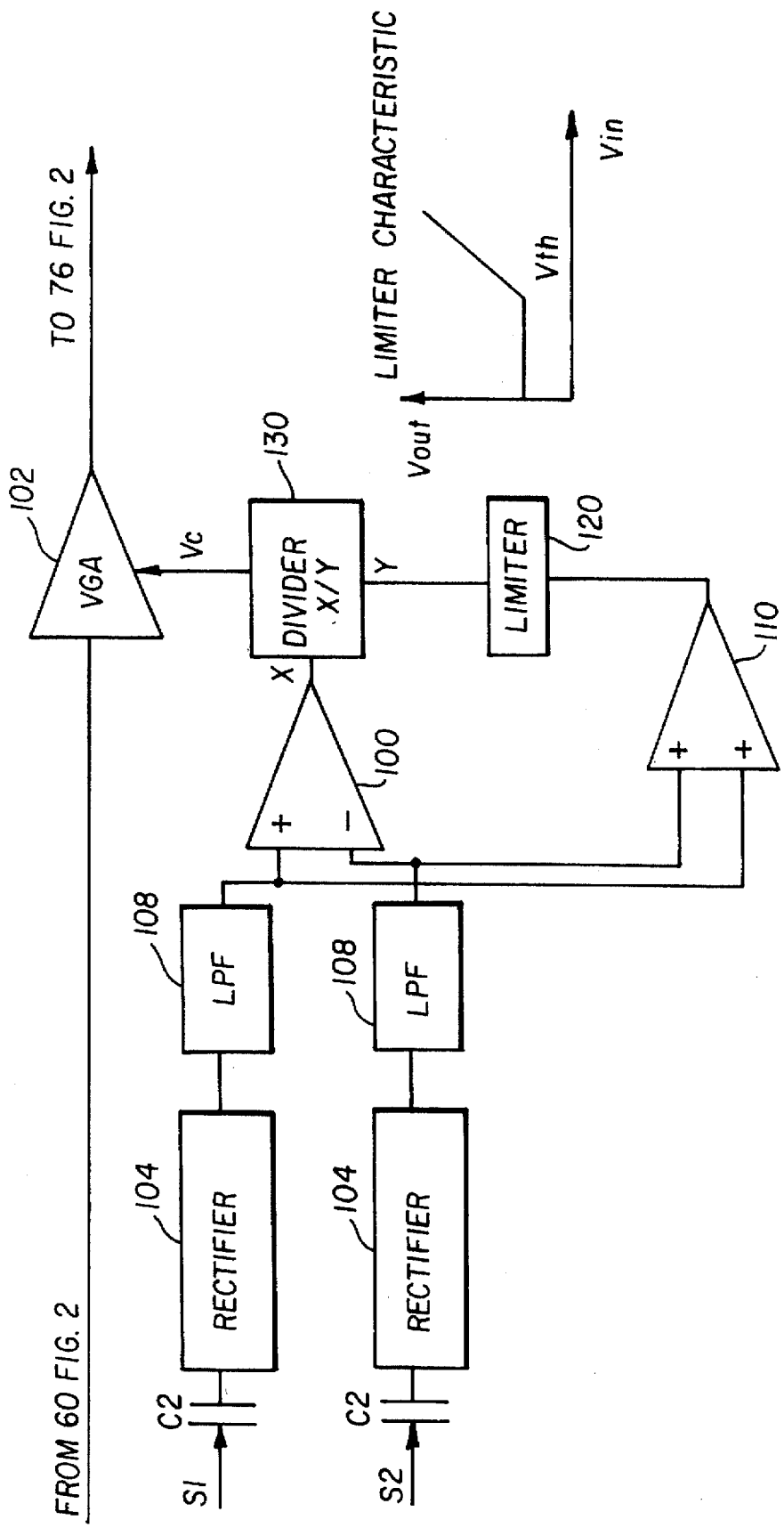
FIG. 3 is a schematic diagram of an exemplary gain control circuit in accordance with the present invention.

FIG. 3 shows a preferred embodiment of the gain control circuit 70 in accordance with the present invention. Detected signals S1 and S2 are applied to two separate rectifier arrangements, each of which includes a capacitor C2 or other suitable DC-blocking filter. The signal passing through capacitor C2 is then rectified in rectifier 104 and filtered in low pass filter 108. The processed S1 and S2 detected signals are differentiated and summed using amplifiers 100 and 110, respectively. The ratio of the difference to the sum is obtained using a divider. In order to prevent the divider from saturation due to, for example loss of signal, a limiter with the characteristic shown in FIG. 3 is used. The resulting output control voltage signal $V_c$ is applied as a control signal to variable gain amplifier 102.

The amplitude of the summation signal passing through variable gain amplifier 102 is thus adjusted in accordance with the voltage control signal $V_c$, which in turn corresponds to the normalized difference between the rectified and filtered version of the detected signals S1 and S2.

The output of variable gain amplifier 102 is sent to differential amplifier 76 of FIG. 2 and automatically adjusted such that detected RF signal components provided to the differential amplifier 76 of FIG. 2 are amplitude matched, thereby improving common-mode rejection and providing an ATIP signal with increased signal-to-noise ratio and phase margin.

The capacitor C2 in FIG. 3 blocks DC components and therefore passes only alternating-current (AC) components of the detected signals. Although those skilled in the art will recognize that C2 does not provide a sharp cut-off at a particular frequency, in this embodiment AC components are generally considered to be components other than DC. In alternative embodiments, C2 may be replaced with a more complex signal filter to provide any desired frequency response in the channel, or may be eliminated such that amplifiers 100 and 110 also receive DC signal components.

The rectifiers 104 in FIG. 3 may be implemented as, for example, a full-wave or half-wave rectifier, an envelope detector, a peak detector, or any of a number of other well-known rectifying circuits.

The variable gain amplifier 102 in gain control circuit 70 may be an amplifier device such as the part No. AD602 available from Analog Devices of Norwood, Mass. The AD602 package includes two matched, low noise, voltage-controlled amplifiers with relatively stable group delay, a maximum control bandwidth of about 1 Mhz, an amplification bandwidth of about 35 Mhz independent of gain setting, a gain scaling of about 32 dB/volt and a gain range of about —10 dB to +30 dB. Of course, amplifiers with other bandwidth and gain parameters could also be used. Alternative variable gain amplifiers include the part Nos. CLC 520 or CLC 522 from Comlinear Inc., of Fort Collins, Colo., and the part No. VCA-610 from BurrBrown, Inc. of Tucson, Ariz. It should be emphasized that these amplifiers are exemplary only, and numerous other alternatives will be apparent to those skilled in the art.

The low pass filters 108 in the FIG. 3 embodiment of gain control circuit 70 limit the bandwidth of the portion of the detected signal that is fed back to control the gain of the summing amplifier 110. This bandwidth limiting reduces potential oscillations in the gain control. The low pass filter 108 may be implemented as, for example, a single-pole resistor-capacitor (RC) network. Higher order filters could also be used, depending on the amount of filtering required in a given application. Of course, other types of filters, including notch or bandpass filters, could be used instead of a low pass filter, although such filters are generally more complex. A LPF suitable for use in the gain control circuit of FIG. 3 has a 3 dB passband of about 1 kHz. The cut-off frequency of low pass filter 108 can vary depending on the application, but it should generally be less than the ATIP signal frequencies and higher than the frequencies of the systematic disturbances that the servo loop is required to track. These systematic disturbances may include, for example, defocus, tilt, groove non-uniformity and media birefringence. For example, in certain applications it may be desirable for the servo to track media birefringence-induced distortions at frequencies of up to 5 kHz or more.

Amplifiers 100 and 110 are preferably a low offset, low bandwidth device such as the OP400 amplifier from Analog Devices of Norwood, Mass. A low offset can limit channel gain error, and a low bandwidth can provide further filtering of modulation noise. In an exemplary embodiment, the bandwidth of differential amplifier 100 is about six to ten times the cut-off frequency of low pass filter 108. This value maintains the low pass filter passband as the dominant passband control of the system.

The divider circuit 130 in FIG. 3 can be embodied by analog devices AD 8539. The limiter 120 in FIG. 3 is used to prevent the divider circuit 130 from saturation in the event of signal loss. Its representative characteristic is shown in FIG. 3.

Although not shown in FIGS. 1 or 2, optical recording system 20 may include additional elements suitable for processing the detected signals. For example, an analog-to-digital converter, microprocessor or computer, memory, and digital-to-analog converter may be included to obtain and process digitized samples of the various signals. In addition, the reference signal could be supplied by a microprocessor or other suitable system controller. Furthermore, those skilled in the art will recognize that the invention may be implemented using digital servo loops.

Figure 4:
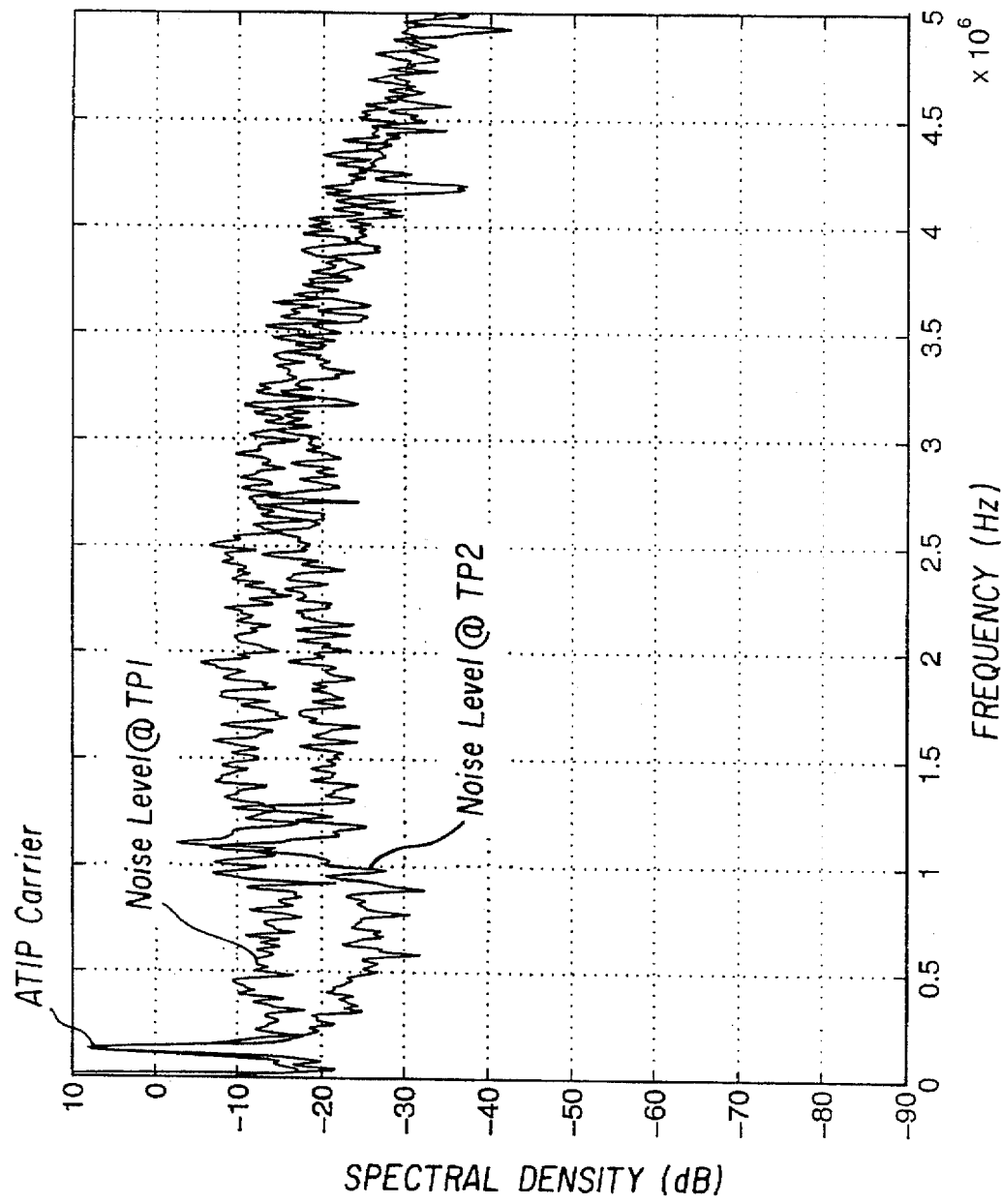
FIG. 4 shows a plot of spectral density vs. frequency at two separate output points 1 and 2 produced by the circuit of FIG. 2.

Test point ① in FIG. 2 represents the conventional ATIP detection signal. Test point ② in FIG. 2 represents the processed ATIP according to the invention described above. FIG. 4 shows a plot at points ① and ② in FIG. 2. This plot demonstrates the effectiveness of the present invention in noise reduction.

The invention has been described with referenced to certain preferred embodiments thereof, but it will be understood that variations and modifications can be effected within the spirit and scope of the invention.

| Parts List | |
| --- | --- |
| $V_c$ | control signal |
| S1, S2 | detected signal |
| C2 | capacitor |
| 20 | optical recording system |
| 32 | optical source |
| 34 | collimating lens |
| 36 | polarization beam expander/splitter |
| 37 | internal surface |
| 38 | focusing lens |
| 40 | front facet detector |
| 42 | quarter wave plate |
| 44 | objective lens |
| 46 | optical storage medium |
| 46A | data storage surface |
| 46B | transparent substrate |
| 52 | detector focusing lens |
| 54 | multi-element detector |
| 54A | detector element |
| 54B | detector element |
| 60 | summing amplifier |
| 64 | difference amplifier |
| 70 | gain control circuit |
| 76 | differential amplifier |
| 78 | bandpass filter |
| 80 | delay element |
| 100 | differential amplifier |

-continued

| Parts List | |
| --- | --- |
| 102 | variable gain amplifier |
| 104 | rectifier |
| 108 | low pass filter |
| 110 | summing amplifier |
| 120 | limiter |
| 130 | divider circuit |

We claim:

1. An apparatus for use in an optical system in which information is read from a recorded wobbled groove of an optical medium by detecting first and second half-aperture components of a return beam in first and second detectors producing detected signals, respectively, the apparatus comprising:

gain control circuit means coupled to the first and second detectors, respectively, and receiving the first and second detected signals therefrom;

the gain control circuit means being responsive to the detected signals for producing a summation signal which is a function of the sum of the two detected signals;

a first signal difference circuit coupled to the first and second detectors for providing a difference signal; and a second signal difference circuit responsive to the difference signal and the summation signal for producing a wobbled groove information signal.

2. The apparatus of claim 1 further including a bandpass filter coupled to the second difference circuit for providing a filter wobbled groove information signal.

3. The apparatus of claim 1 wherein the gain control means includes a summation circuit responsive to the detected signals and a gain control circuit responsive to the output of the summation circuit.

4. The apparatus of claim 1 wherein the information signal includes absolute-time-in-pregroove (ATIP) information.

5. The apparatus of claim 1 further including at least one delay circuit connected between the first and second difference circuits to substantially match the phase of the inputs to the second difference circuit.

6. The apparatus of claim 1 wherein the gain control circuit includes:

a variable gain amplifier coupled to the summation circuit and having a control signal input for receiving a control signal;

means for producing the control signal including first and second rectifier circuit means each responsive to a separate detector signal for producing an output;

a third difference circuit and a second summation circuit responsive to the outputs of the rectifiers; and divider means coupled to the third difference and the second summation circuits for dividing the output of the third difference circuit by the second summation circuit to product control circuit.

7. The apparatus of claim 6 wherein the divider means includes a driver circuit and a limiter circuit.

* * * * *